United States Patent
Kumada

(10) Patent No.: US 6,563,944 B1
(45) Date of Patent: *May 13, 2003

(54) IMAGE PROCESSING APPARATUS AND METHOD THAT AUTOMATICALLY SELECTS A SUBSTITUTE OUTPUT DEVICE

(75) Inventor: Shuichi Kumada, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/296,625

(22) Filed: Apr. 23, 1999

(30) Foreign Application Priority Data

Apr. 27, 1998 (JP) .......................................... 10-116897

(51) Int. Cl.[7] .......................... G06K 15/02; G06F 3/12; G06F 13/00; H04N 1/60
(52) U.S. Cl. ........................ 382/162; 358/1.9; 358/518; 358/1.15
(58) Field of Search ................................. 382/162–167, 382/218; 358/518, 519, 520, 523, 1.9, 1.15, 504, 453; 345/591, 604; 399/49, 54; 348/453

(56) References Cited

U.S. PATENT DOCUMENTS

| | | | | |
|---|---|---|---|---|
| 4,941,038 A | * | 7/1990 | Walowit | 358/518 |
| 5,268,754 A | * | 12/1993 | Van de Capelle et al. | 358/527 |
| 5,323,249 A | * | 6/1994 | Liang | 358/518 |
| 5,384,901 A | * | 1/1995 | Glassner et al. | 345/591 |
| 5,402,361 A | * | 3/1995 | Peterson et al. | 382/167 |
| 5,668,890 A | * | 9/1997 | Winkelman | 382/167 |
| 5,754,184 A | * | 5/1998 | Ring et al. | 345/604 |
| 5,835,624 A | * | 11/1998 | Ueda et al. | 382/162 |
| 5,907,415 A | * | 5/1999 | Yabe | 382/167 |
| 5,907,667 A | * | 5/1999 | Shiraishi | 382/167 |
| 6,204,939 B1 | * | 3/2001 | Lin et al. | 358/518 |

* cited by examiner

Primary Examiner—Jayanti K. Patel
(74) Attorney, Agent, or Firm—Fitzpatrick, Cella, Harper & Scinto

(57) ABSTRACT

In an image processing apparatus, it is possible to automatically select a substitute output device which is substituted for an indicated output device and can reproduce a color image equivalent to that output by the indicated output device. The apparatus comprises a judgment function for judging whether or not output is to be performed by the indicated output device, and a selection function for selecting, if it is judged by the judgment function that the output is not to be performed by the indicated output device, the substitute output device on the basis of color reproduction information of output devices being candidates for the indicated output device.

5 Claims, 10 Drawing Sheets

FIG. 9

COLOR REPRODUCTION SELECTION

PRINT IS IMPOSSIBLE BY PRINTER B

PRINT BY ANOTHER PRINTER ?

⊙ YES    ○ NO

IMAGE PROCESSING APPARATUS AND METHOD THAT AUTOMATICALLY SELECTS A SUBSTITUTE OUTPUT DEVICE

BACKGROUND OF THE INVENTION

1. Field of the Invention

The present invention relates to image processing apparatus and method for automatically selecting a substitute output device substituted for an indicated output device, and a storage medium for storing a program to execute the image processing method.

2. Related Background Art

A color printer has a different range capable of reproducing color (referred as color gamut hereinafter), in accordance with characteristics (ink characteristic, toner characteristic, recording method and the like) of the printer.

FIG. 1 shows an example of such the color gamut. In the drawing, x and y coordinates called as chromaticity coordinates are frequently used in a case where the color gamut of the color printer (or color device) is represented in a two-dimensional area. Further, the areas respectively indicated by the solid line, the dashed line and the alternate short and long dashed line represent the color reproducible areas of color printers A, B and C, respectively. As apparent from FIG. 1, the color gamut of the printer A is wider than that of the printer C, the color gamut of the printer C is wider than that of the printer B, and the color gamut of the printer B is completely included in the color gamut of the printer A. Namely, all the colors reproducible by the printer B are also reproducible by the printer A.

FIG. 2 shows an example of the structure of a printer profile according to ICC (International Color Consortium) profile specifications. The profile is composed of a header section which stores therein information used in profile management, a tag table which stores therein pointers used to access tag data, and a tag data storage section which stores therein a required tag, an optional tag and a private tag. Concretely, the header section stores therein device information representing which device (e.g., monitor) the profile corresponds to, CMM (color management module) information representing which CMM the profile is used in, and the like. The tag data storage section stores therein profile description information for discriminating the profile. As the profile discrimination information, e.g., information representing a maker name and a product name such as "CANON LBP-2030" is stored. Further, the required tag includes a gamut tag as the data representing the color gamut of the printer.

FIG. 3 is a view showing the data structure of the gamut tag. The gamut tag stores therein the data for checking whether or not input device-independent color (CIE XYZ color space or CIE LAB (referred as L*a*b* hereinafter) color space) can be output by the printer in question. If the gamut tag has the data for checking all combinations of input data, the data capacity of the tag becomes tremendously large. Therefore, in order to prevent this, generally, the three-dimensional input color space is divided into plural grids, the gamut tag has the data only for the grids, and interpolation based on the data of the peripheral grids is performed for the input color not corresponding to any grids to obtain the output color. In the example shown in FIG. 3, the input L*a*b* color space is divided into four grids. Then, for each grid, if the input color data can be output by the printer, ON data is stored in the tag, while if the input color data can not be output, OFF data is stored. Further, for the color data between adjacent grid points (i.e., color data not corresponding to any grids), the interpolation based on the data of the grids being the vertexes of the cube surrounding or enclosing the data in question is performed, and either of the ON and OFF data is obtained for such the data.

FIG. 4 is a view for explaining the gamut check function of the CMM. The gamut check function is to judge whether or not input R (red), G (green) and B (blue) data of which characteristics are defined by a source profile (i.e., scanner profile or monitor profile) can be output by the printer of which characteristic is defined by a printer profile. Concretely, a gamut check function in the CMM checks whether or not the input R, G and B data can be output by the printer, on the basis of the information of the source profile and the data in the gamut tag of the printer profile. If the data can be output by the printer, the gamut check function outputs the ON data, while if the data can not be output, the function outputs the OFF data.

FIG. 5 is a view for explaining in detail the process of the gamut check function shown in FIG. 4. The input R, G and B data are initially converted into L*a*b* data on the basis of the information (i.e., data necessary to convert R, G and B data into data of device-independent L*a*b* color space) in the source profile. Then, it is judged whether or not the obtained L*a*b* data can be output by the printer, by using the data of the gamut tag in the printer profile. If the data can be output by the printer, the gamut check function outputs the ON data, while if the data can not be output, the function outputs the OFF data.

As explained above, it has been known that, by using the data of the gamut tag in the printer profile, it is possible to judge whether or not the color data can be output by the intended printer.

In the conventional network system, if the color data can not be output by the selected color printer due to mass printing, some error or the like, the image data can not be output by using a substitute color printer automatically selected in view of color reproduction.

That is, in the conventional system, if the error occurs, a user himself must select another color printer and newly instruct the selected printer to perform printing.

Further, in recent years, as a network system for use in the case where the data can not be output by the selected printer, it has been thought the system for automatically selecting another printer according to whether or not an original is a color original. That is, if the original is judged as the color original, a color printer is automatically selected as the substitute printer.

However, in such the system, color reproducibility is not considered when the color printer is selected. As described above, since the gamut is different according to a kind of printer, the color reproducibility is also different according to the kind of printer. For this reason, there is a problem that the image of which tint is different from that expected by the user is output. That is, if the image having different tint is output, the user must again output the image by using another color printer.

SUMMARY OF THE INVENTION

An object of the present invention is to enable an image processing apparatus to automatically select a substitute output device which is substituted for an indicated output device and can reproduce a color image equivalent to that output by the indicated output device.

Especially, the object is to enable the apparatus to obtain a satisfactory substitute output by automatically selecting the substitute output device substituted for the indicated output device, on the basis of gamut data important in the color reproduction.

In order to achieve the above object, it is provided the image processing apparatus which automatically selects the substitute output device substituted for the indicated output device, the apparatus comprising:

a judgment function for judging whether or not output is to be performed by the indicated output device; and a selection function for selecting, in a case where it is judged by said judgment function that the output is not to be performed by the indicated output device, the substitute output device on the basis of color reproduction information of output devices being candidates for the indicated output device.

Another object of the present invention is to enable an image processing apparatus to easily construct a system from an existing system by selecting a substitute output device with use of gamut data stored in a profile used for a color matching process.

In order to achieve the above object, it is provided the image processing method which automatically selects the substitute output device substituted for an indicated output device, the method comprising the steps of:

inputting color gamut information stored in the profile corresponding to plural output devices used in the color matching process; and automatically selecting the substitute output device on the basis of the color gamut information of the indicated output device and the color gamut information of the other output devices.

Still another object of the present invention is to enable a user to select a substitute output device according to user's purposes.

In order to achieve the above object, it is provided a method which automatically selects the substitute output device substituted for an indicated output device, the method comprising the steps of:

inputting color gamut information of the indicated output device and color gamut information of output devices being candidates for the indicated output device;

selecting the substitute output device on the basis of the color gamut information of the indicated output device and the output devices being the candidates for the indicated output device; and grouping the output devices connected to a network, wherein the other output devices in a group to which the indicated output device belongs are handled as the output devices being the candidates for the indicated output device.

Other objects and features of the present invention will become apparent from the following detailed description and the attached drawings.

BRIEF DESCRIPTION OF THE DRAWINGS

FIG. 9 is a view showing a display dialog-box in a step S103 of FIG. 8;

DETAILED DESCRIPTION OF THE PREFERRED EMBODIMENTS (First Embodiment)

Figure 6:
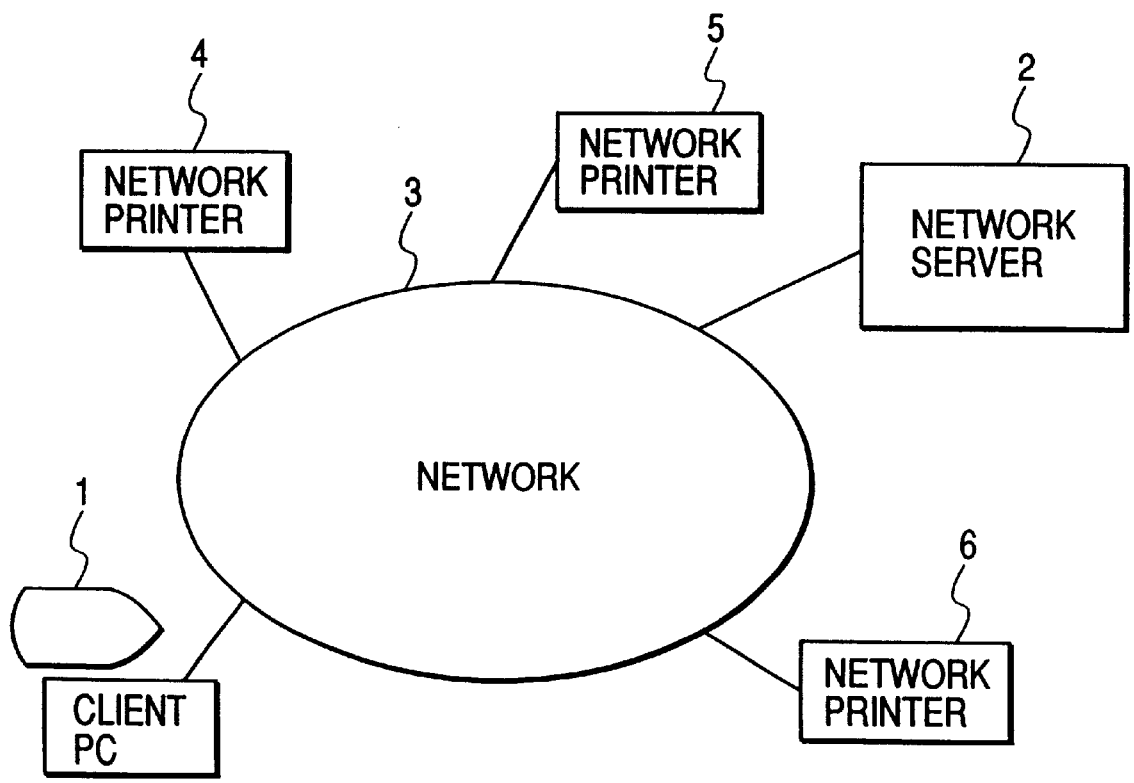
FIG. 6 is a view showing the structure of a network system according to one embodiment of the present invention.

FIG. 6 is a view showing the structure of a network system according to one embodiment of the present invention.

As shown in FIG. 6, the network system according to the present embodiment is composed of a client personal computer (PC) 1, a network server 2, network printers 4, 5 and 6, and a network 3. The client PC 1, the server 2 and the printers 4 to 6 are all connected to the network 3.

The network server 4 has a CPU (central processing unit), a RAM (random access memory), a hard disk and the like necessary for an image process and a printing process, and has a communication function necessary for network communication.

In the system, the network printers 4, 5 and 6 correspond to printers A, B and C, respectively.

Figure 7:
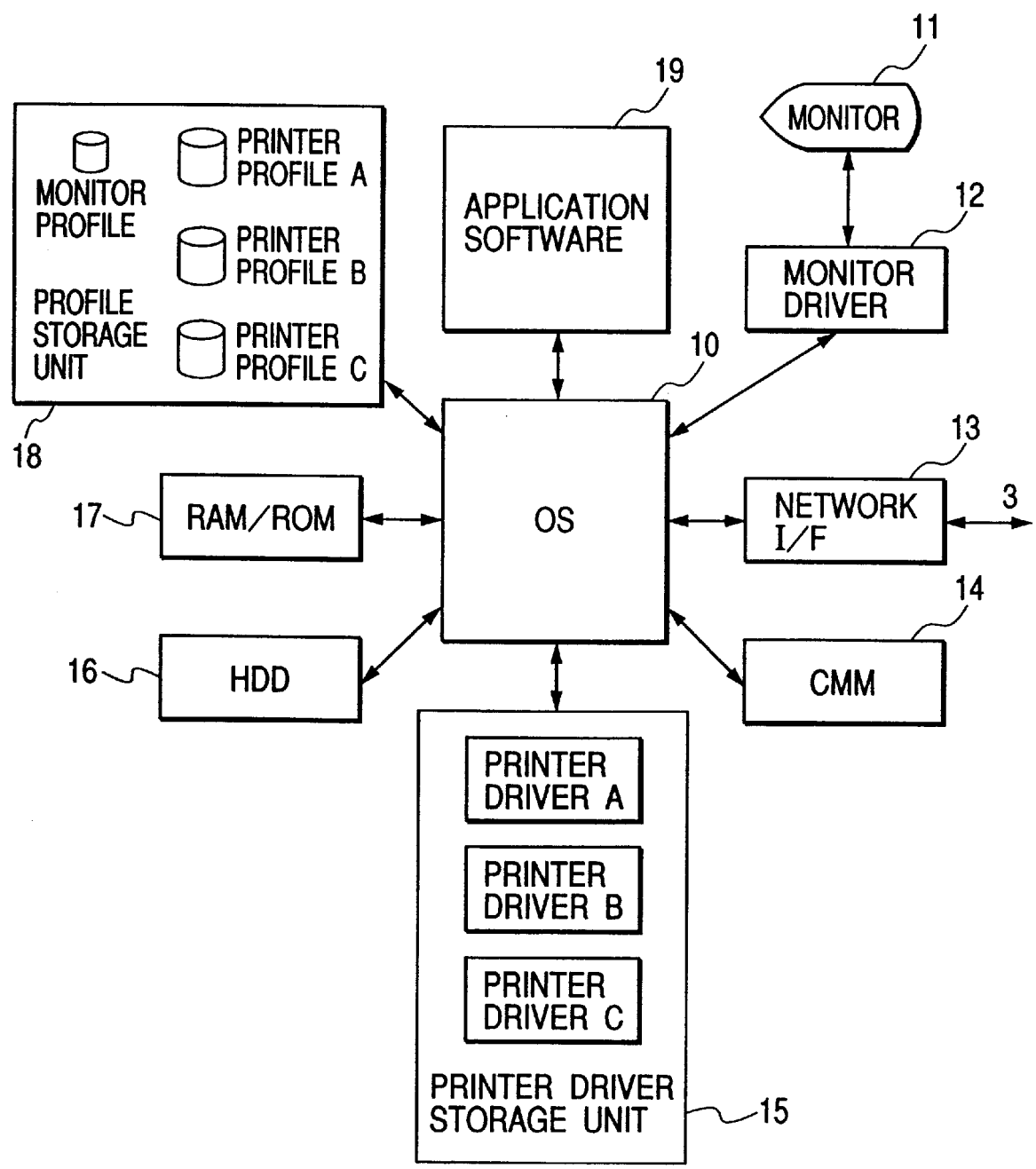
FIG. 7 is a block diagram showing the structure of a client PC 1 shown in FIG. 6.

FIG. 7 is a block diagram showing the structure of the client PC 1 shown in FIG. 6. As shown in FIG. 7, the client PC 1 has a CPU, a VRAM (video random access memory) and the like necessary for monitor display and image process. Further, the client PC 1 has an OS (operating system) 10 for providing a basic function necessary for an operation of a software such as an application software or the like, a monitor 11, a monitor driver 12 for controlling the monitor display, a network interface (I/F) 13 for connecting the client PC 1 with the network 3, a CMM 14 being a module for performing a color matching process, a printer driver storage unit 15 for storing printer drivers A, B and C respectively corresponding to the network printers A, B and C, a HDD (hard disk) 16, a RAM/ROM (random access memory/read-only memory) 17 used as a working memory by the application software and the OS in the color matching process and the like, a profile storage unit 18 for storing printer profiles A, B and C respectively corresponding to the network printers A, B and C and storing a monitor profile corresponding to the monitor 11, and an application software 19 for producing or managing a color document.

Figure 8:
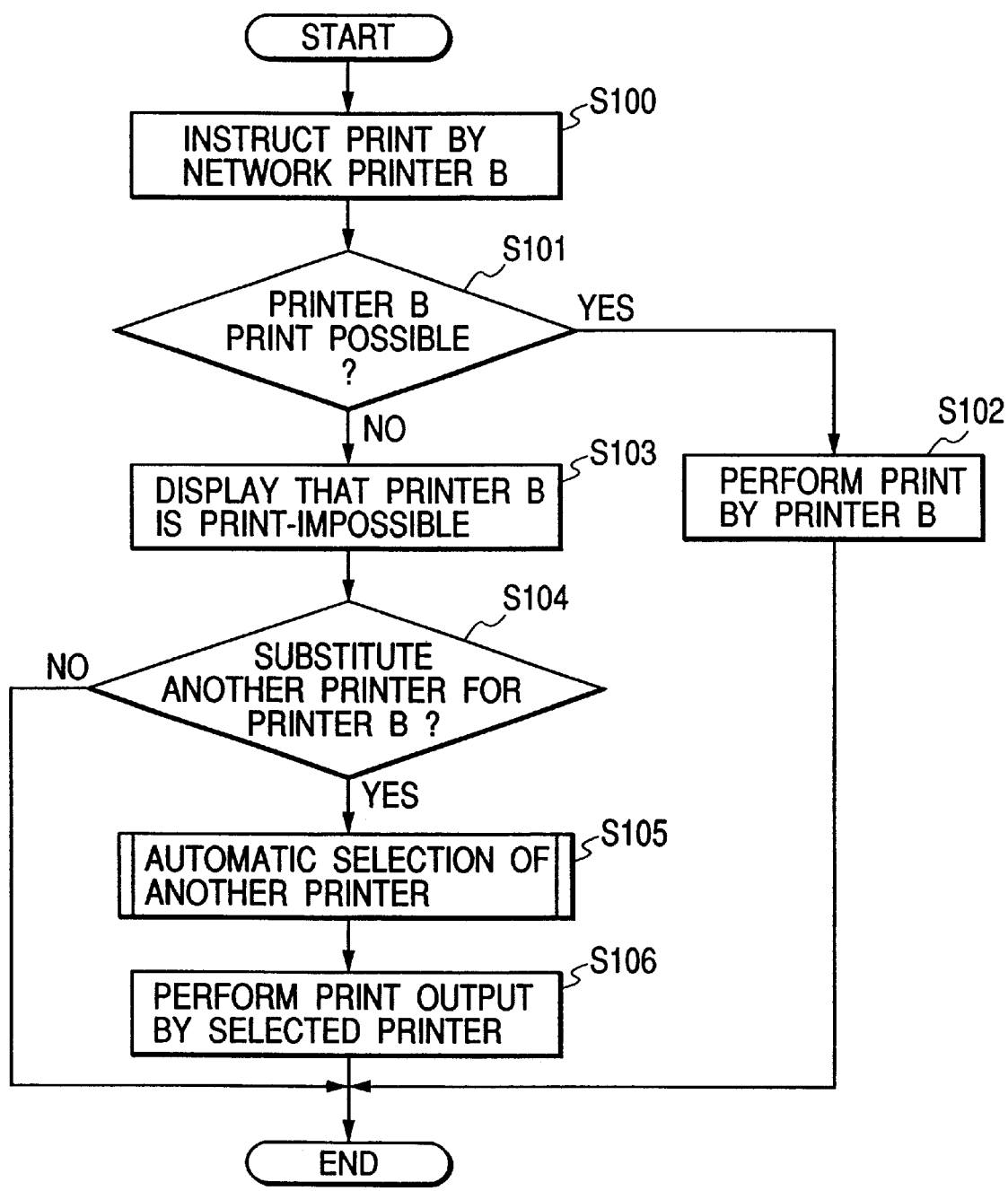
FIG. 8 is a flow chart showing a process which is to be performed when a printer B is selected and color data is output by the selected printer B, in a case where the color data is printed on the basis of an application software 19 in a network system.

FIG. 8 is a flow chart showing the process which is to be performed when the printer B is selected and color data is output by the selected printer B, in a case where the color data is printed based on the application software 19 in the network system.

In a step S100, the printer driver B for the printer B is selected from the printer driver storage unit 15, and the printing by the printer B is instructed. Then, the flow advances to a step S101.

In the step S101, it is judged whether or not the printing is possible by using the printer B. If judged that the printing of the printer B is possible, the flow advances to a step S102 to perform the printing by using the printer B. Then, the process terminates.

On the other hand, if judged in the step S101 that the printing is impossible by using the printer B due to mass printing, some error or the like, the flow advances to a step S103.

In the step S103, in order to notify the user that the printing of the printer B is impossible, such a state is displayed on the dialog-box of the application software 19. Then, the flow advances to a step S104.

In the step S104, it is checked whether or not the printing is to be performed by using another network printer. It should be noted that the printing by using another network printer is called as substitute printing hereinafter. The operation in this step can be realized by displaying "Substitute another printer for printer B?" on the dialog-box such that the user can select "YES" or "NO". If judged in the step S104 that the substitute printing is not to be performed, then the process terminates. On the other hand, if judged that the substitute printing is to be performed, the flow advances to a step S105 to automatically select one of the other network printers (i.e., printer A or C in the present embodiment), and then advances to a step S106.

Figure 1:
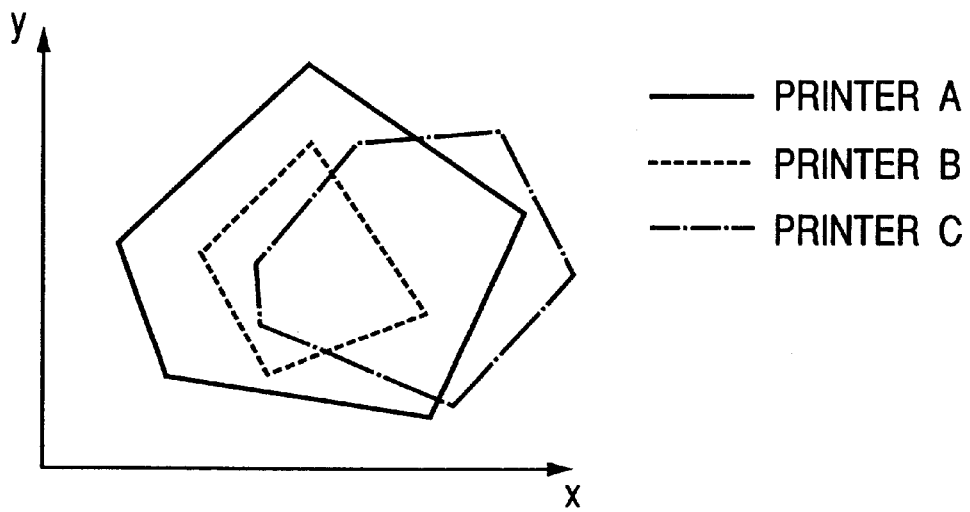
FIG. 1 is a view showing an example of the color gamut of a color printer.
Figure 2:
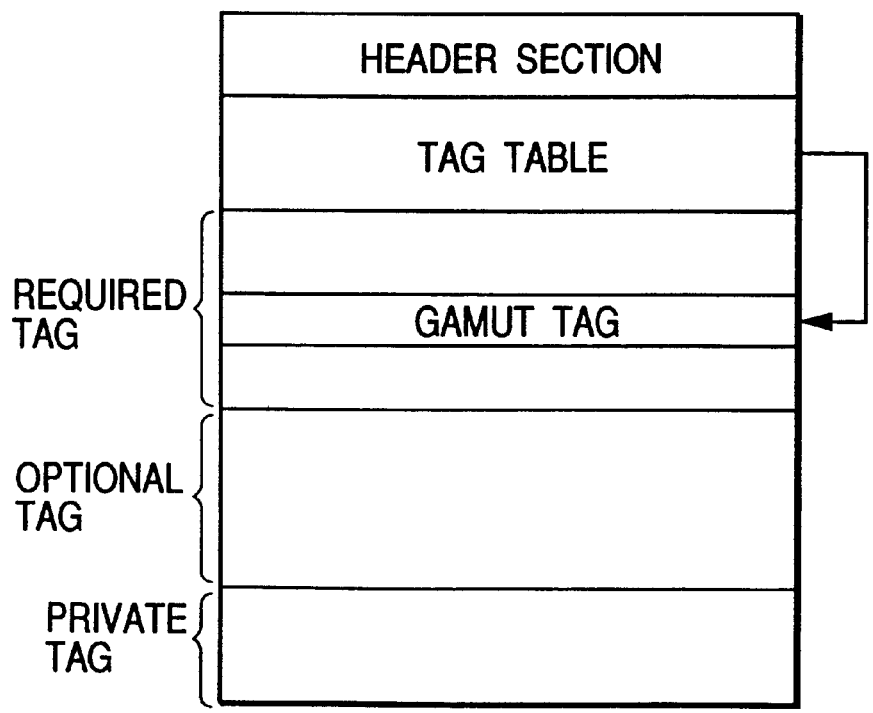
FIG. 2 is a view showing an example of the structure of a printer profile according to ICC (International Color Consortium) profile specifications.
Figure 3:
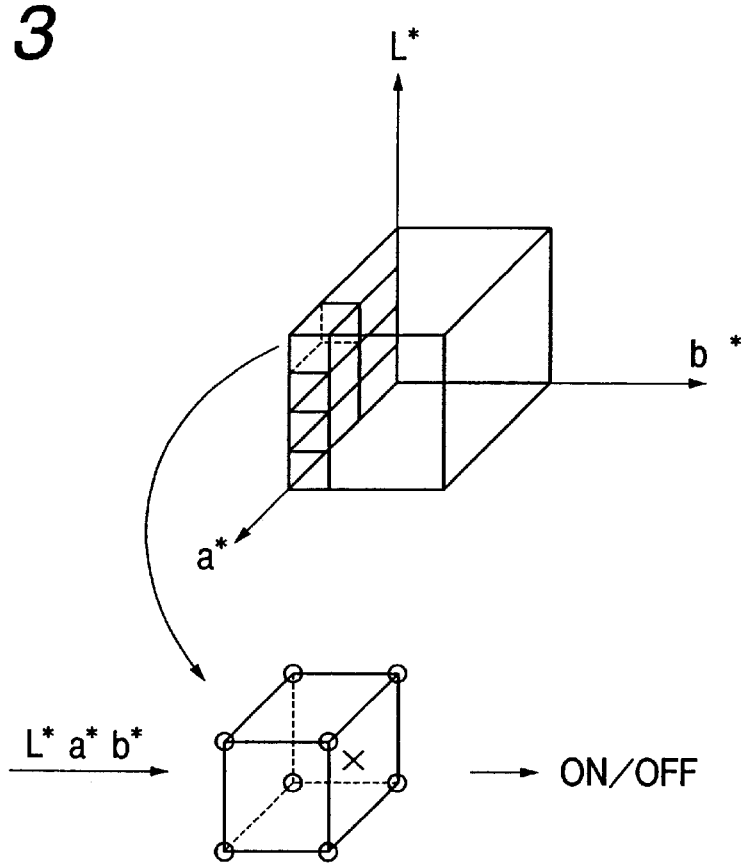
FIG. 3 is a view for explaining the data structure of a gamut tag.
Figure 4:
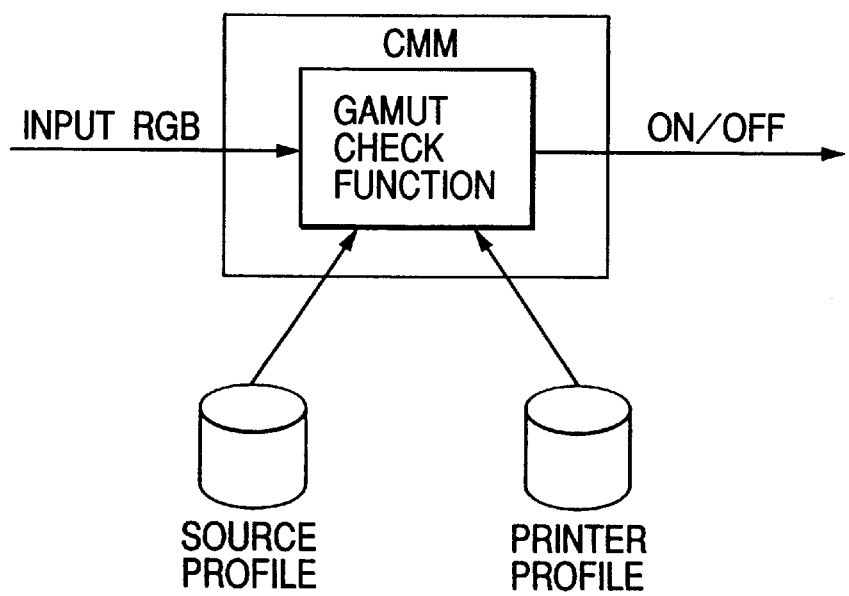
FIG. 4 is a view for explaining the function of gamut check in a CMM (color management module)
Figure 5:
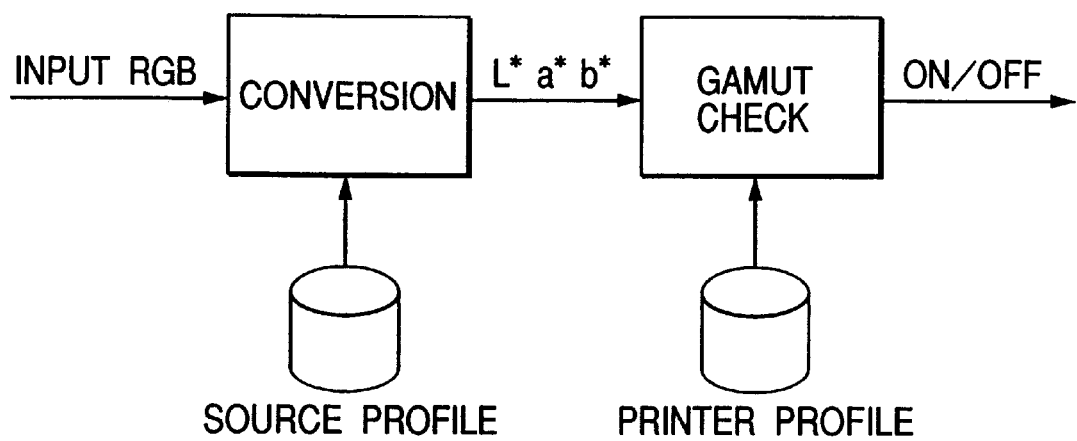
FIG. 5 is a view for explaining in detail a process by the gamut check function shown in FIG. 4.

In the step S106, the printing is performed by using the printer selected in the step S105, and then the process terminates. In the step S106, the monitor profile is given to the CMM 14 as the source profile, the printer profile corresponding to the printer selected in the step S105 is given to the CMM 14 as the printer profile, and the color matching process as shown in FIG. 4 is performed. Then, the image data subjected to the color matching process is given to the printer driver corresponding to the selected printer, whereby the printing process is performed.

As described above, in the case where it is intended to select the printer B from among the plural color printers in the network system and then print the color data on the basis of the application software 19 by using the selected printer B, even if the data output is impossible by the printer B due to mass printing, some error or the like, it is possible to automatically select another printer A or C and perform the printing by using the selected printer.

FIG. 9 shows an example of the display dialog-box mentioned in the step S103 of FIG. 8.

The dialog-box in FIG. 9 displays that the printing by the printer B is impossible, thereby asking the user whether he intends to continue the printing by using another printer. In response to such asking, the user may select "YES" if he intends to do so, while the user may select "NO" if he does not intend to do so.

Figure 10:
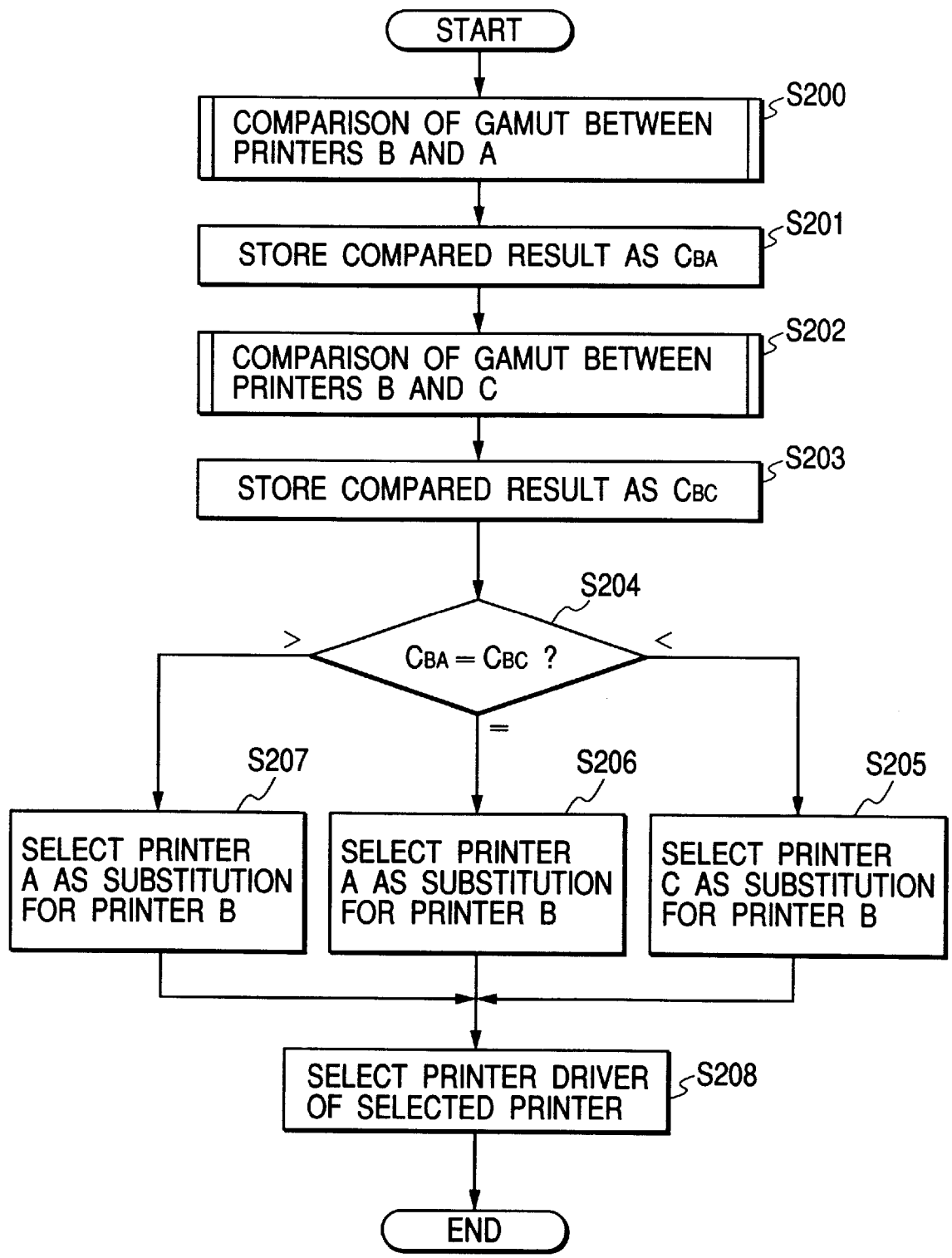
FIG. 10 is a flow chart showing the detailed process in a step S105 of FIG. 8.

FIG. 10 is a flow chart showing the details of the automatic selection process in the step S105 of FIG. 8.

Initially, in a step S200, the gamut size of the printer A is compared with that of the printer B to check the area common to the printers A and B, and the flow advances to a step S201.

In the step S201, the result checked in the step S200 is stored as $C_{BA}$ (constant), and the flow advances to a step S202.

In the step S202, the gamut size of the printer B is compared with that of the printer C to check the area common to the printers B and C, and the flow advances to a step S203.

In the step S203, the result checked in the step S202 is stored as $C_{BC}$ (constant), and the flow advances to a step S204.

In the step S204, the values of the constants $C_{BA}$ and $C_{BC}$ are compared with each other.

Here, if the value of the constant $C_{BC}$ is larger than that of the constant $C_{BA}$, this means that the common area of the printers C and B is larger than that of the printers A and B. Therefore, it is possible to judge from the viewpoint of color reproduction that the printer C is suitable for the substitute printer rather than the printer A. Then, the flow advances to a step S205 to select the printer C as the printer substituted for the printer B, and the flow further advances to a step S208. It should be noted that the judgment standard in the step S204 corresponds to priority order of the printers previously set by the user (e.g., network manager).

In the step S204, if the value of the constant $C_{BC}$ is equal to that of the constant $C_{BA}$, this means that the common area of the printers C and B is identical with that of the printers A and B. Therefore, it is possible to judge from the viewpoint of color reproduction that each of the printers C and A is suitable for the substitute printer. Then, the flow advances to a step S206 to select the printer A as the printer substituted for the printer B, and the flow further advances to the step S208.

Further, in the step S204, if the value of the constant $C_{BC}$ is smaller than that of the constant $C_{BA}$, this means that the common area of the printers A and B is larger than that of the printers C and B. Therefore, it is possible to judge from the viewpoint of color reproduction that the printer A is suitable for the substitute printer rather than the printer C. Then, the flow advances to a step S207 to select the printer A as the printer substituted for the printer B, and the flow further advances to the step S208.

In the step S208, the printer driver selected in the step S205, S206 or S207 is selected, and then the process terminates.

As above, the gamut data in the printer profile for the printer B is compared with that for the other printers, and the printer of which area in the gamut common to that of the printer B is largest is selected, whereby it is possible to select the optimum substitute printer from the viewpoint of color reproduction.

Figure 11:
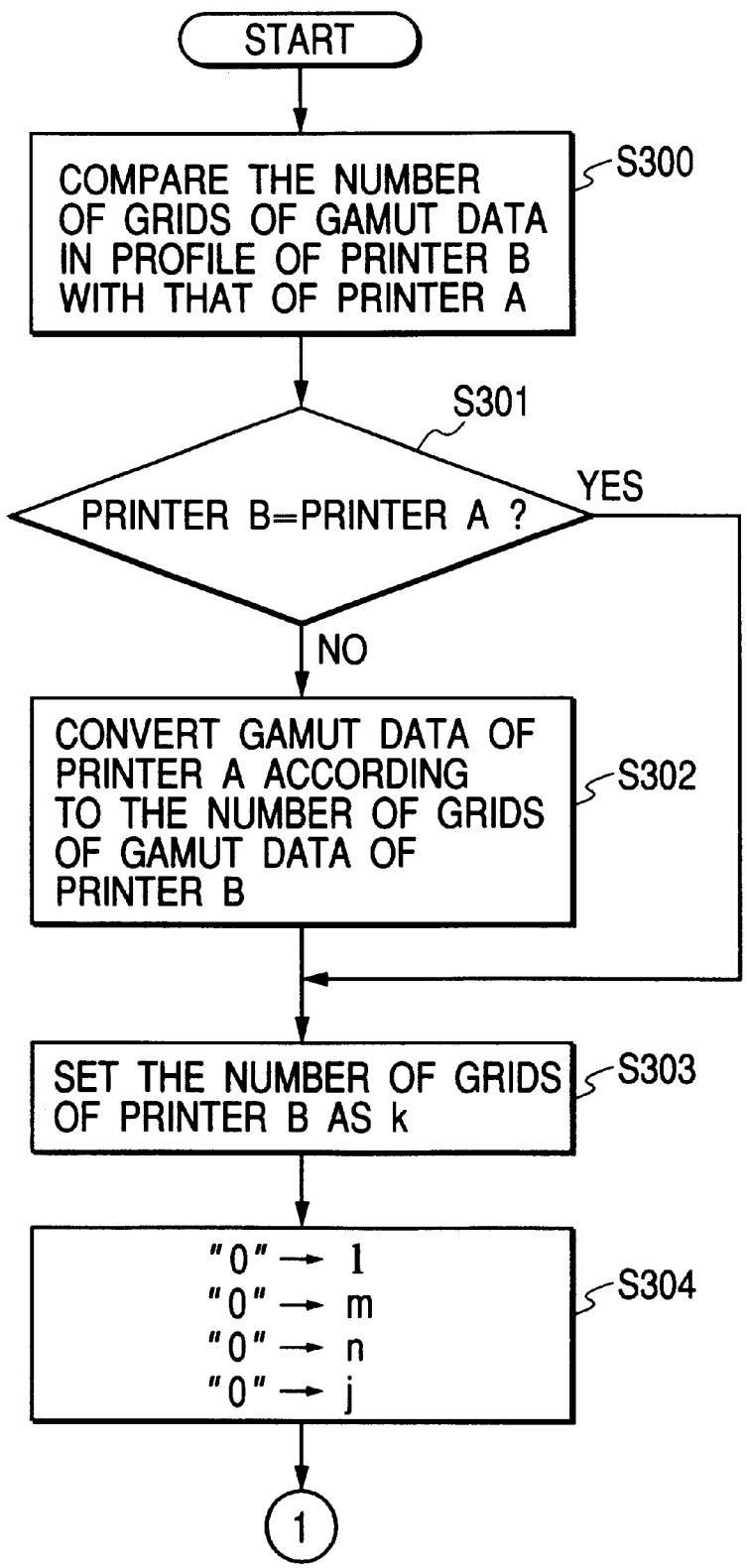
FIG. 11 is a flow chart showing the detailed process in a step S200 of FIG. 10.
Figure 12:
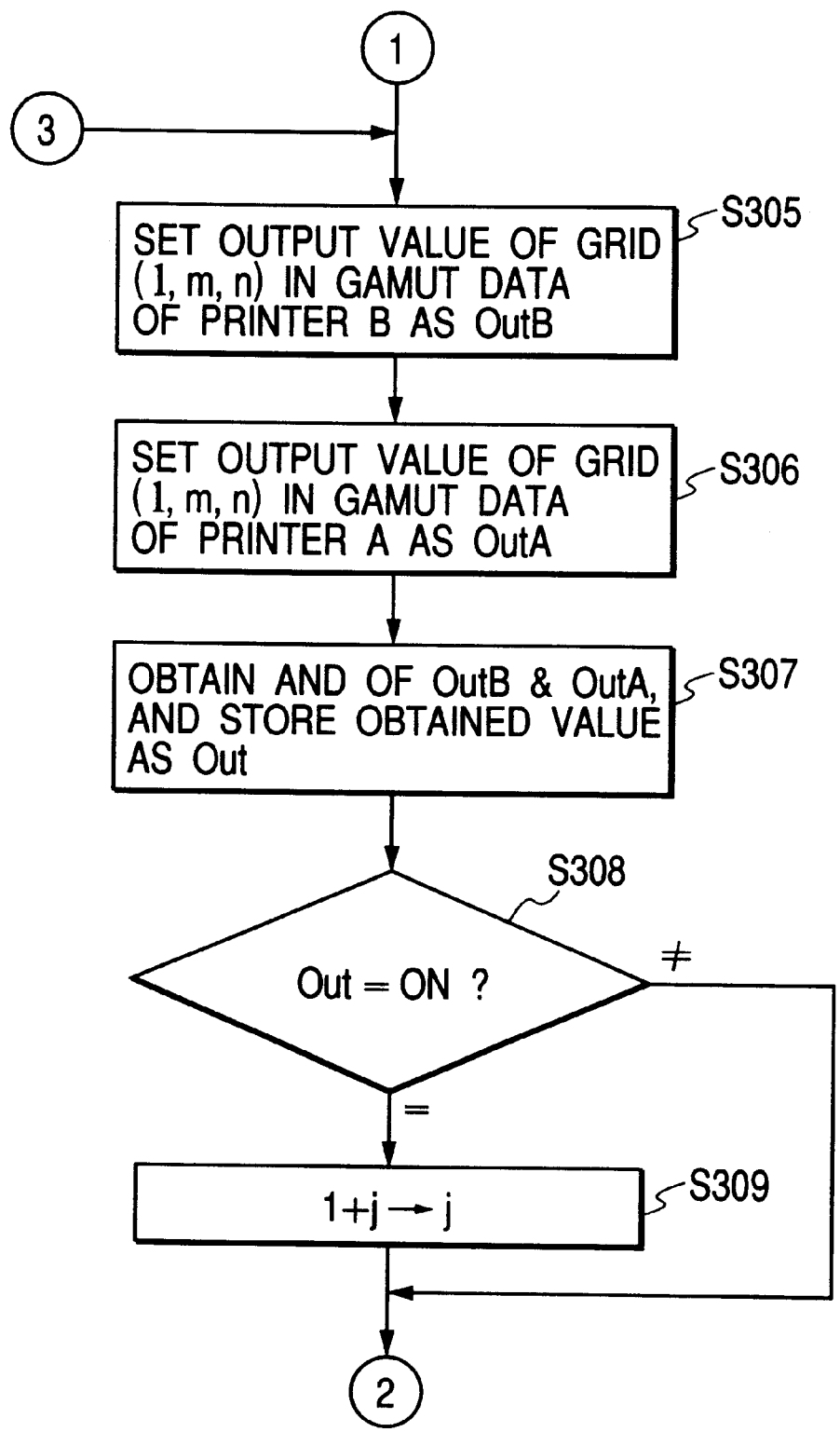
FIG. 12 is a flow chart showing the detailed process in the step S200 of FIG. 10.
Figure 13:
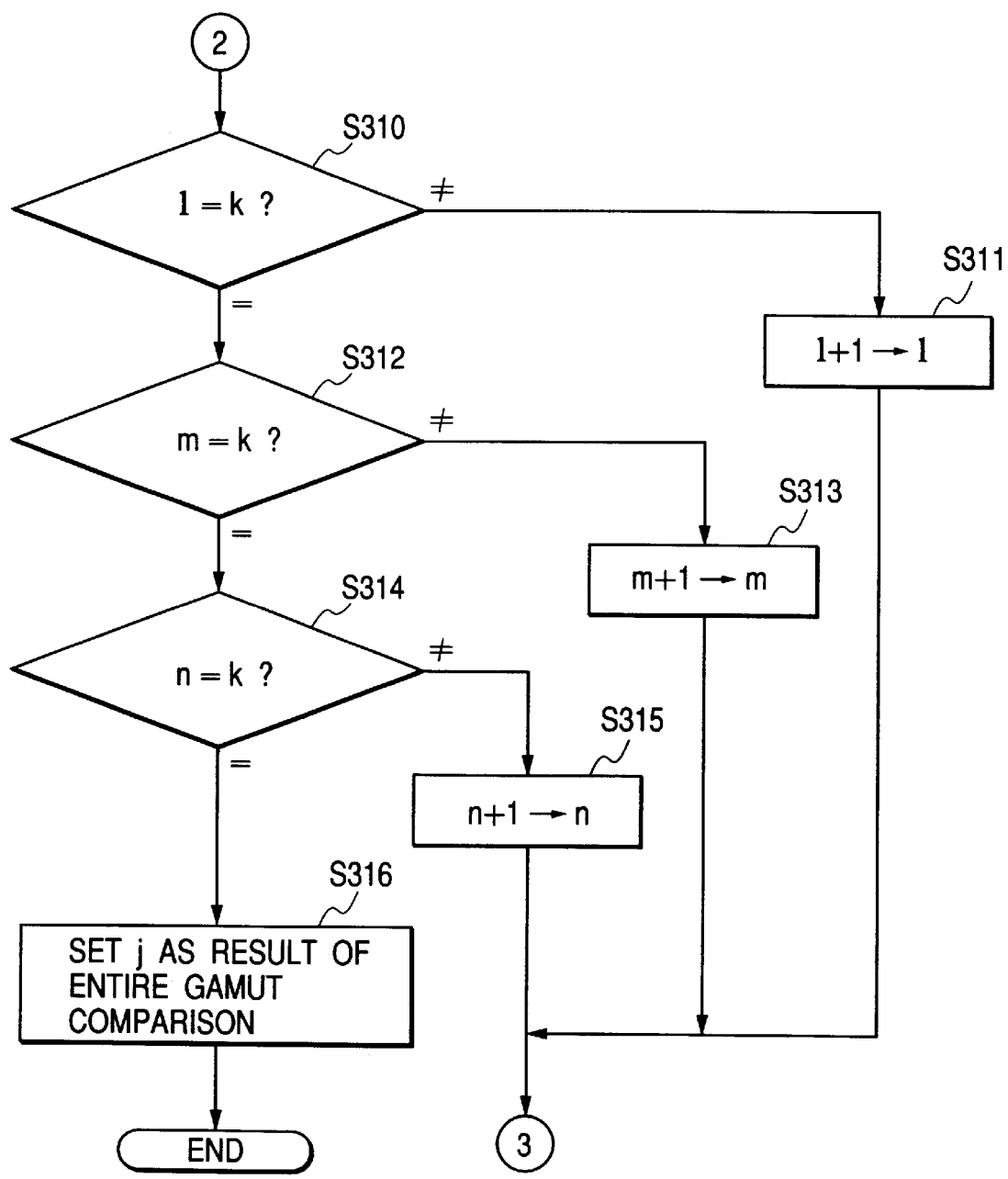
FIG. 13 is a flow chart showing the detailed process in the step S200 of FIG. 10.

FIGS. 11, 12 and 13 are flow charts showing the details of the process in the step S200 of FIG. 10. It should be noted that, if the printer A is replaced with the printer C in the step S202 of FIG. 10, the process of the step S202 becomes identical with that of the step S200.

Initially, in a step S300, the number of grids of the gamut data stored in the gamut tag of the printer profile for the printer B is compared with the number of grids of the gamut data stored in the gamut tag of the printer profile for the printer A, and the flow advances to a step S301.

In the step S301, if the number of grids for the printer B is equal to the number of grids for the printer A, the flow advances to a step S303. On the other hand, if the number of grids for the printer B is not equal to the number of grids for the printer A, the flow advances to a step S302 to convert the gamut data in the printer profile for the printer A in accordance with the number of grids of the gamut data for the printer B, and the flow further advances to the step S303.

By the process in the step S302, it is possible to make the number of grids of the gamut data for the printer A coincident with the number of grids of the gamut data for the printer B, whereby it is possible to effectively perform following comparison processes. Further, since the number of grids of the substitute output device is made coincident with the number of grids of the output device indicated in the step S100, it is possible to effectively perform the comparison processes from the viewpoint of both color reproduction and processing speed.

In the step S303, the number:of grids of the gamut data for the printer B is set as a constant "k", and the flow advances to a step S304.

In the step S304, "0" is set to constants "l", "m", "n" and "j" respectively, and the flow advances to a step S305.

In the step S305, the output value stored for the grids (l, m, n) in the gamut data for the printer B is set as "OutB", and the flow advances to a step S306.

In the step S306, the output value stored for the grids (l, m, n) in the gamut data for the printer A is set as "OutA", and the flow advances to a step S307.

In the step S307, AND (logical product) of the values "OutB" and "OutA" is obtained, and the obtained value is stored as the value "Out".

Then, in a step S308, the value "Out" is checked. If the value "Out" is not "ON", the flow advances to a step S310. On the other hand, if the value "Out" is "ON", the flow advances to a step S309 to perform increment of the constant "j" by one, and the flow advances to the step S310.

In the step S310, the value of the constant "l" is checked.

That is, if the value of the constant "l" is different from the value of the constant "k", the flow advances to a step S311 to perform increment of the constant "l" by one and then returns to the step S305. On the other hand, if the value of the constant "l" is equal to the value of the constant "k", the flow advances to a step S312 to check the value of the constant "m". If the value of the constant "m" is different from the value of the constant "k", the flow advances to a step S313 to perform increment of the constant "m" by one and then returns to the step S305. If the value of the constant "m" is equal to the value of the constant "k", the flow advances to a step S314 to check the value of the constant "n". Then, if the value of the constant "n" is different from the value of the constant "k", the flow advances to a step S315 to perform increment of the value "n" by one and then returns to the step S305. On the other hand, if the value of the constant "n" is equal to the value of the constant "k", the flow advances to a step S316 to set the value of the constant "j" as the result of the entire output value check. Then, the process terminates.

As above, it is possible to obtain an index indicating the size of the area common to the gamuts of the printers A and B. Namely, as the value of the constant "j" is larger, such the common area is wider, and the value of the constant "k" corresponds to the maximum value of the constant "j".

According to the present embodiment, in the case where any one of the plural color printers in the network system is selected to perform the outputting, if it is impossible for the selected printer to perform the printing, then it is possible to automatically select the substitute output device on the basis of the gamut data important in the color reproduction. Therefore, by using the substitute output device, it is possible to output the image having the tint close to that of the image output by the selected printer.

Further, since the gamut data stored in the profile to be used in the conventional color matching process is used, it is possible to easily realize the function of selecting the substitute output device even in the conventional system.
(Second Embodiment)

The first embodiment supposes the small-scale network system as shown in FIG. 6.

On the other hand, the second embodiment is a modification derived from the first embodiment. That is, the second embodiment to be explained hereinafter supposes a large-scale network system. In the large-scale network system, there is a possibility that a number of printers are connected thereto. Moreover, there is a possibility that some of these printers are put at considerably distant positions.

In consideration for such a situation, a user previously selects the arbitrary printers and groups them.

Then, in case of automatically selecting another printer in the step S105 of FIG. 8, the gamut of the printer indicated in the step S100 is compared with the gamuts of the printers within the group previously set by the user, to select the optimum substitute printer.

That is, since the user previously groups the plural printers in an arbitrary manner, it is possible to prevent that the image obtained in the substitute printing is output at the position inconvenient for the user.

As a method to group the printers, for example, it is thought that the printers are grouped according to a printing system such as an electrophotographic system, an inkjet system or the like. It has been known that, if the printing system varies, then the color reproducibility also varies. Therefore, even if the gamut of one printer is common to that of the other printer, it is thought that a tint or hue of the image printed by one printer is different from that of the image printed by the other printer. For this reason, by previously grouping the plural printers according to the printing system, it is possible to automatically select the substitute printer in consideration of not only the gamut but also the printing system, thereby guaranteeing high-precision color reproducibility in the substitute printing.

As described above, by adding a grouping function to the process of the first embodiment for automatically selecting the substitute printer, it is possible to realize various printer selection forms according to user's purpose. In this case, it is possible to select the substitute output device in consideration of not only the gamut and the printing system but also another information (e.g., gradation, tonality or the like) concerning the color reproduction.

In the above embodiments, the comparison process for the color gamuts is performed every time the substitute output device is selected. However, the present invention is not limited to this. That is, it is possible to register the result obtained in one comparison process and then select the substitute output device on the basis of the registered result.

Further, it is possible to apply the above substitute output device selecting process to a case where the substitute output device is selected as it attaches importance to the color reproducibility. Further, for example, it is possible to apply this selecting process to not only the above case where it is impossible for the indicated output device to perform the outputting but also to other processes such as a proof process and the like.
(Other Embodiments)

The present invention also includes a case where, in order to realize the functions explained in, e.g., FIGS. 8 to 13, program codes of software for realizing the functions of the above embodiments are supplied to a computer (CPU or MPU) in an apparatus or a system, and thus the computer in the apparatus or the system operates the various devices according to the supplied program codes.

In this case, the program codes themselves realize the functions of the above embodiments. Therefore, the program codes themselves and a means for supplying the program codes to the computer (e.g., storage medium storing program codes) constitute the present invention.

As the storage medium for storing the program codes, it is possible to use, e.g., a floppy disk, a hard disk, an optical disk, a magneto-optical disk, a CD-ROM, a magnetic tape, a non-volatile memory card, a ROM and the like.

Further, it is possible to obviously understand that not only in a case where the functions of the above embodiments are realized based on the supplied program codes executed by the computer, but also in a case where the functions of the above embodiments are realized based on the program codes cooperating with an OS (operating system) running on the computer or another application software, the present invention includes these program codes.

Further, it is possible to obviously understand that the present invention also includes a case where, after the supplied program codes are stored in a memory of a function expansion board in the computer or a memory of a function expansion unit connected to the computer, a CPU or the like provided in the function expansion board or the function expansion unit performs a part or all of the actual processes on the basis of instructions of the program codes, and thus the functions of the above embodiments are realized by such the processes.

The present invention has been described in detail with particular reference to preferred embodiments thereof, but it will be understood that variations and modifications can be effected within the spirit and scope of the present invention as set forth in the appended claims.

What is claimed is:

1. An image processing method that automatically selects a substitute output device to substitute for an indicated output device, said method comprising the steps of:

inputting color gamut information of the indicated output device and color gamut information of output devices that are candidates for the indicated output device; and selecting a substitute output device based on the color gamut information of the indicated output device and the color gamut information of the output devices that are the candidates for the indicated output device.

2. A method according to claim 1, further comprising the step of grouping the output devices connected to a network, wherein output devices in a group to which the indicated output device belongs are handled as the output devices that are the candidates for the indicated output device.

3. An image processing method that automatically selects a substitute output device to substitute for an indicated output device, said method comprising the steps of:

inputting color gamut information stored in a profile corresponding to plural output devices used in a color matching process; and automatically selecting a substitute output device based on color gamut information of the indicated output device and the color gamut information of the plural output devices other than the indicated output device.

4. A computer-readable recording medium storing a program for automatically selecting a substitute output device to substitute for an indicated output device, the program comprising:

code for inputting color gamut information of the indicated output device and color gamut information of output devices that are candidates for the indicated output device; and code for selecting a substitute output device based on the color gamut information of the indicated output device and the color gamut information of the output devices that are the candidates for the indicated output device.

5. A computer-readable recording medium storing a program for automatically selecting a substitute output device to substitute for an indicated output device, the program comprising:

code for inputting color gamut information stored in a profile corresponding to plural output devices used in a color matching process; and code for automatically selecting a substitute output device based on color gamut information of the indicated output device and the color gamut information of the plural output devices other than the indicated output device.

* * * * *